United States Patent [19]

Frattarola et al.

[11] 4,389,712
[45] Jun. 21, 1983

[54] HIGH INFORMATION DENSITY LASER IMAGE RECORDING METHOD AND APPARATUS

[75] Inventors: Joseph R Frattarola, Westford; Richard H. Hudgin, Newton; Theodore R. Yachik, Belmont, all of Mass.

[73] Assignee: Itek Corporation, Lexington, Mass.

[21] Appl. No.: 885,057

[22] Filed: Mar. 9, 1978

[51] Int. Cl.³ .................... G11C 11/42; G11C 13/04
[52] U.S. Cl. .................................. 365/127; 358/298
[58] Field of Search ............... 365/127, 120; 358/298, 358/299

[56] References Cited

U.S. PATENT DOCUMENTS

| 3,806,643 | 4/1974 | Russell | 365/127 |
| 3,832,528 | 8/1974 | Ake | 365/127 |
| 3,838,402 | 9/1974 | Gracie | 365/127 |

*Primary Examiner*—Terrell W. Fears
*Attorney, Agent, or Firm*—Homer O. Blair; Robert L. Nathans; Gerald H. Glanzman

[57] ABSTRACT

An optical memory for storing human readable pictorial information and machine readable digital information within the same format together with a method and apparatus for recording such information. In accordance with the invention, information is formatted as human readable imagery with the machine readable digital data being stored as picture elements of the image.

In accordance with a presently most preferred embodiment, each of the many picture elements (pixels), which together comprise the image, are formulated as a plurality of spots, the modulation level of each of which are independently controllable among several levels for recording information digitally within the picture elements, while at the same time, providing the picture elements with the proper optical density values to provide a visual analog presentation of the image.

Although the invention has application in a variety of fields, it is particularly suitable for use in laser image reconstruction applications wherein it can be utilized to provide a pictorial reconstruction of an original scene while, at the same time, record, in an easily accessible manner, the full dynamic range of the information acquired about the original scene within the human readable reconstruction.

In addition to storing information in both a human readable and machine readable format, the invention also provides a high information packing density capability as well as a great deal a flexibility in processing and handling information.

16 Claims, 9 Drawing Figures

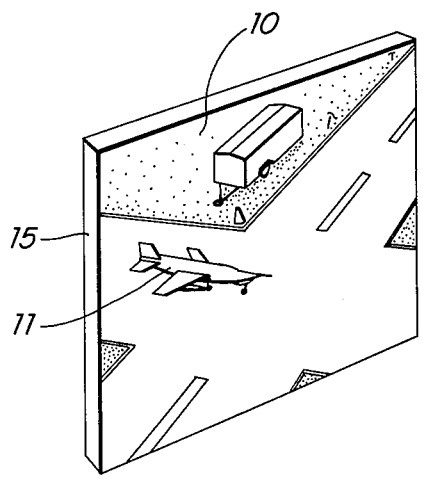
FIG. 1.
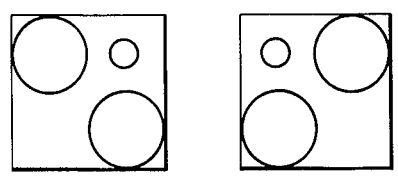
FIG. 3A.   FIG. 3B.
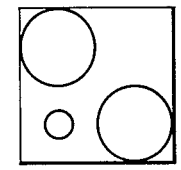
FIG. 3C.
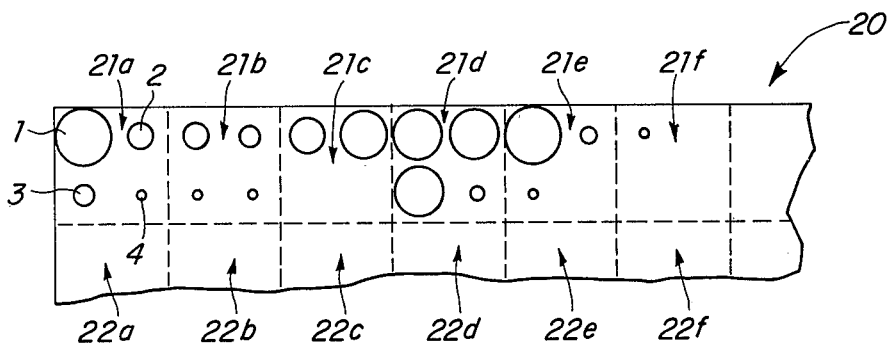
FIG. 2.
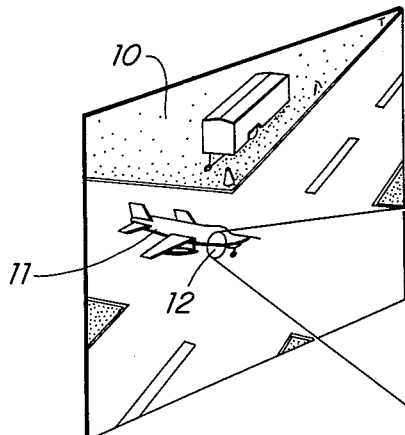
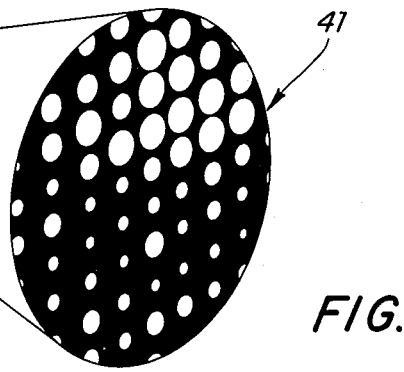
FIG. 4.

HIGH INFORMATION DENSITY LASER IMAGE RECORDING METHOD AND APPARATUS

BACKGROUND OF THE INVENTION

1. Field of the Invention

The present invention relates generally to an optical memory for storing information together with a method and apparatus for recording such information. More specifically, the present invention relates to an optical memory for storing human readable pictorial information and machine readable digital information within the same format as well as a laser beam recording method and apparatus for recording such information in an easily accessible manner.

2. Description of the Prior Art

State-of-the-art laser recording systems have demonstrated the capability of recording large blocks of information at high recording rates. This information may be recorded in either a machine readable digital format or, alternatively, in a human readable pictorial format. In the former, digitized imagery is stored in bit sequential fashion by appropriate encoding techniques such that it may later be retrieved to reconstruct, for example, an original scene; while, by the latter method, a visual analog presentation of the scene is provided.

The recording and storage of optical data in the digital domain provides the advantage of allowing very high bit packing densities, however, the stored information remains in the digital domain and as such is less accessible than pictorial data. The recording of optical data in human readable form, on the other hand, provides a convenient visual representation of the original scene, however, it does so at a loss of digital data dynamic range storage due to the inability of conventional continuous-tone recording mediums to contain the dynamic range normally encountered in advanced sensors.

Thus, in the prior art, the practice has become to record and store large dynamic range pixels in the pure digital domain while providing a separate image recorder to reconstruct the pictorial format. This is obviously a less than satisfactory situation and it would be desirable to provide an optical recording technique which will permit the recording of large digital pixel words within a human readable pictorial format, but organized for machine retrieval of the original digital information.

SUMMARY OF THE INVENTION

In accordance with the present invention, a novel optical recording method and apparatus is provided whereby image recording and digital storage can be simultaneously merged together to form a composite data base which is both human readable and machine readable. Stated differently, the recording technique according to the present invention, which we refer to as the 3-D matrix recording technique, provides an easily accessed digital memory which is organized into a human readable pictorial form.

In accordance with a presently preferred embodiment, a novel method of pixel formulation is provided whereby the digital data base is formatted into quantized pixel values. Specifically, a pixel is formulated as a plurality of discrete areas or spots, the modulation level of each of which is independently controllable among several different values. By proper control over the modulation level of each of the individual spots making up the pixel, information can be digitally recorded within the pixel, while, at the same time, providing the pixel as a whole with the appropriate optical density value to construct an area of the image.

As will be explained in much greater detail hereinafter, the method of pixel formulation according to the present invention provides an accurate analog representation of an original scene in a human readable form, while, at the same time, permits all of the data received by the sensors examining the original scene to be recorded within the framework of the human readable reconstruction. The invention can be practiced with generally conventional laser recording and retrieval equipment and provides a tremendous amount of flexibility in processing the information.

Specific details and features of the invention will be set out hereinafter in conjunction with the detailed description of the preferred embodiments.

BRIEF DESCRIPTION OF THE DRAWINGS

FIG. 1 illustrates a reconstructed image of an original scene.

FIG. 2 schematically illustrates a very small portion of the reconstructed image of FIG. 1, greatly enlarged for purposes of explanation.

FIGS. 3A, 3B and 3C illustrate three pixel formulations to assist in understanding the present invention.

FIG. 4 illustrates the selective information retrieval capability of the present invention.

DETAILED DESCRIPTION OF THE PREFERRED EMBODIMENTS

Figure 5:
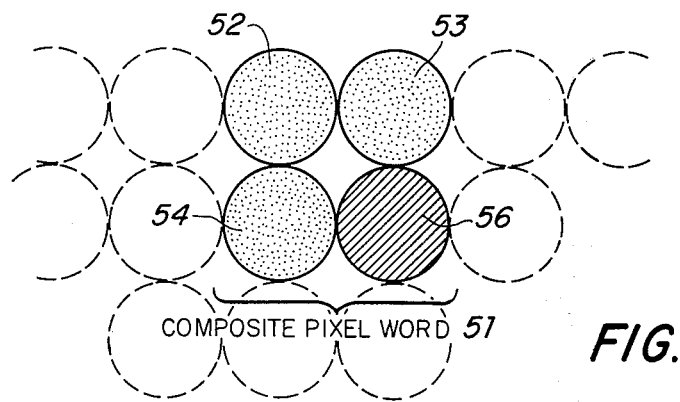
FIG. 5 illustrates the selective data fusion capability of the present invention.

A laser recorded image may be considered as being made up of a very large number of individual picture elements or pixels arranged in a frame raster pattern to represent the optical sampling of an actual scene. Usually, the value of each pixel is commanded by a single digital word which identifies the desired optical density of a specific area along the scan line.

In a typical high quality image reconstruction system, as many as 256 distinct pixel optical density values or gray levels can be achieved within the dynamic range of a high quality recording medium to achieve a 48 db performance. Although the human eye can readily distinguish only about 32 different gray levels, such a degree of exposure control can contribute to the final image exploitation by specialized human observers.

Often, however, the recorded pixel values are commanded by digital words that contain a dynamic range far in excess of any recording medium. For example, the 12 bit pixel data word digitally contains 4096 values or a pixel dynamic range of 20 log 4096 = 72.2 db. Thus, in the prior art, a great deal of data is lost when the information is transferred into an image format from the computer tape or disc.

The optical recording of more complete information can be accomplished in the prior art, however, it can only be done in the machine readable domain where large bit words can be recorded and retrieved. As mentioned previously, however, this data base storage format does not permit visual access to the information.

The present invention provides an optical memory whereby all the information stored digitally on the magnetic tape or disc can be stored for easy machine retrieval, while, at the same time, it is recorded in such a manner that it is organized into a human readable pictorial format. This novel optical memory is achieved essentially by utilization of a novel method of pixel formulation, and before describing this technique in detail, it is believed that it would be helpful to first describe some of the principal prior art techniques of pixel formulation used in laser image recording.

Typical laser image recorders employ an analog beam intensity modulation to control variable exposure at the recording film plane. Specifically, each scanned line within the raster produced image contains a specific number of pixels, and the exposure value of each pixel is generated by a single digital word which identifies the desired optical density of a specific area along the scan line. Adjacent pixels can be merged or blended by maintaining a high duty-cycle pixel exposure (i.e., by having an exposure time that is long compared to the short transition time between exposures).

By reducing pixel exposure duty-cycle, it becomes possible to record the pixels as discrete spots spaced along the scan line. Specifically, appropriate optics and exposure timing determines the spacing between spots while the pulse exposure value controls the recorded spot optical density.

With this approach, the image is essentially quantized into discrete pixel values representative of the incoming digital data, and two techniques utilizing this approach have been suggested in the prior art.

One of these techniques is referred to as the Variable Spot Recording technique. In this technique, a pixel line consists of equally spaced quantized spots that vary in optical density in accordance with the input modulation signal. Each of the spots represents a full pixel value within the dynamic range of the recording medium. For most recording films, spot intensity modulation provides the exposure control, while for metal-on-plastic recording, spot power density modulation controls the diameter of each spot and variations in spot size represent the desired pixel optical density. Typically, with this technique, all spots are recorded on maximum diameter centers of, for example, 6 microns, and each spot may vary in diameter from 0 to 6 microns.

By use of this Variable Spot Technique, a moderate number of distinct pixel values can be attained within a small pixel area.

A second technique which also utilizes this quantizing approach employs a plurality of spots to record a single pixel value. Specifically, a designated pixel area is divided into a plurality of spot locations, for example, a matrix of spot locations. The digital input pixel value is electronically converted into a spot address code which determines which of the spot locations within a given pixel area are to be exposed. In this technique exposure is completely binary in that a spot is either recorded or it is not.

In practicing this technique, image size is a function of the number of spots defining a pixel, spot size and their location. Thus, pixel packing density must be sacrificed in order to obtain precise control of gray level over a larger dynamic range. For a very high gray level content to be obtained, the pixel area must grow considerably.

None of the above techniques of pixel formulation are very suitable for achieving the goals of the present invention which, as stated previously, is to record large blocks of machine readable information organized into a human readable pictorial format. Accordingly, to effectively practice the present invention, a novel method of pixel formulation is desired, and FIGS. 1 and 2 illustrate a presently most preferred technique. Specifically, FIG. 1 illustrates a reconstructed image 10 of an original scene (not shown) recorded on any conventional optical recording medium 15, for example, a metal-on-plastic material or conventional film. Information regarding the original scene may have been obtained in any conventional manner utilizing any desired image data acquisition equipment such as visible, infrared or microwave imaging sensors. The signals from the sensors are processed in the usual manner and converted into digital form for storage on magnetic tapes, discs or the like. This digital data is then utilized to control the laser beam recorder to generate the reconstructed image.

FIG. 2 illustrates, in schematic form, a very small section 20 of reconstructed image 10 greatly enlarged for purposes of clarity. As shown, and as in the prior art, reconstructed image 10 is actually made up from a very large number of picture elements or pixels 21a-21f; 22a-22f, etc., arranged in a raster format, which when put together constructs the image 10. In addition, however, and as illustrated in FIG. 2, each of the pixels is formulated as a plurality of discrete parts or spots, and, in particular, as a 2×2 square matrix of four spots (or spot locations) 1, 2, 3 and 4. For convenience of illustration only we have physically separated adjacent pixels from one another by dotted lines.

Furthermore, the modulation level of each of the four spots making up the pixel are independently controllable among a plurality of possible values depending upon the dynamic range of the particular recording material employed.

Each of the four spots making up a pixel are recorded on maximum diameter centers of, for example, 6 microns, and may be varied in size (or in intensity in the case of conventional films) from 0 to 6 microns in discrete jumps.

With the present invention, the pixel exposure level (i.e., pixel optical density value or gray level) is equal to the sum of the optical densities of each of the spots making up the pixel, and, because the modulation level of each of the spots can be independently controlled, the number of possible pixel exposure levels that can be achieved is quite large and can be achieved without any significant loss in pixel packing density. A few of the many possible spot formulations that may be recorded to produce different pixel exposure levels are illustrated in FIG. 2 as pixels 21a-21f.

In general terms, the number of distinct pixel exposure levels or gray levels that can be attained by this method of pixel formulation is defined by the following equation:

$$M = N^2[Z] + 1$$

where:

M = the number of distinct pixel exposure levels,
Z = the number of modulation levels for each spot in the matrix making up the pixel, and
$N^2$ = the number of spots within the square matrix.

For example, let us assume that we have a 2×2 matrix with the spots recorded on centers spaced by 6 microns. Let us further assume that each of the spots can be varied among 8 possible modulation levels. In the case of metal-on-plastic recording, this means varying the size of each spot among 8 different possible sizes. By the 3-D Matrix Technique $M=2\times2[8]+1=33$ distinct pixel exposure levels are attainable, and, since the human eye can readily discern only about 32 different gray levels, this is perfectly adequate to produce a human readable visual analog of the original scene.

By utilizing higher quality recording materials and/or by increasing the size of the matrix, a much greater number of gray levels can also be achieved. This will be expanded on hereinafter. In any event, by utilizing only a $2\times2$ matrix to define a pixel having a total pixel area of only $12\times12$ microns, a good quality visual representation of an original scene can be provided within the dynamic range of essentially any recording material.

It should furthermore be understood that although a pixel formulation in the form of a $2\times2$ square matrix of spots is illustrated in FIG. 2, other matrices may be used as well if desired. Also, as will be explained hereinafter, other spot arrangements and other spot shapes may be employed as well without departing from the present invention.

The equation given above, $M=N^2[Z]+1$, defines the number of non-redundant, non-overlapping exposure levels of a single pixel. In formulating a pixel as described above, it should be apparent that there will be many pixel formulations that are redundant insofar as they will result in the pixel having the same optical density value. For example, FIGS. 3A, 3B and 3C each illustrate distinctly different pixel formulations, however, the optical density value of each of these forumlations will be identical since the total area of the spots in each formulation is identical. Thus, any of the pixel formulations illustrated in FIGS. 3A, 3B or 3C (as well as many others) can be used interchangeably in reconstructing the original scene for human readability. Accordingly, although, as described above, pixels formulated as $2\times2$ matrices of spots in which each of the spots can be varied among 8 different modulation values, can produce 33 distinct exposure levels, it is actually possible to formulate the pixel in $8^4=4096$ distinctly different ways and these different ways can be readily distinguished from one another by machine. This is the real heart of the present invention. By proper control over the modulation level of each of the individual spots, it becomes possible to record information digitally within the framework of the pixel, while, at the same time, controlling the optical density value of the pixel as a whole to provide a human readable pictorial image. It has been found, in fact, that by using a $2\times2$ matrix of spots with each spot having 8 possible modulation levels, it is possible to record 4096 twelve bit digital words organized to grow monotonically through the range of pixel optical densities within the framework of a human readable pictorial image.

In general, with the present invention, an optical memory is provided by which information can be stored in a high density manner and be read out in either a human readable analog format or a machine readable digital format while preserving the full dynamic range of the digital collection device. This eliminates the need to record large dynamic range pixels in the purely digital domain while providing a separate image recorder to reconstruct the pictorial format as presently done in the prior art.

In addition to the basic convenience of recording information in this way, the significant advantages provided by the present invention are numerous. For example, it permits information to be retrieved selectively. Let us assume that we have reconstructed image 10 (FIG. 1) of an original scene and that we wish to study in detail only a small portion of that image, for example, the airplane 11 or even only a small portion 12 of the airplane as illustrated in FIG. 4. In the prior art, it would be necessary to search through the large amount of data stored in the digital domain to find the data of interest. In the present invention, the human eye can immediately discern the image area of interest and since all the information regarding that portion of the original scene is stored right within the human readable image as spot pattern 41, it can immediately be retrieved.

Furthermore, the invention provides a selective data fusion capability which is illustrated in FIG. 5. Specifically, in FIG. 5, a composite pixel word 51 made up of a $2\times2$ matrix of spots is shown in solid line. With the present invention, it is possible to utilize only three of the four spots, spots 52, 53 and 54, for example, to record the primary image data. The fourth spot location, 56, can be reserved and used to add collateral data, for example, textual data, to the record in real time by the user.

As yet another feature, the present invention can be utilized to record optical memories storing intelligence information from several sensors, which may include one or more non-imaging sensors, including visible, IR, microwave, etc. Subsequently, the optically retrieved signals from each of these sensor memories can be selectively fused to create a composite multi-sensor data base memory.

In a similar vein, we can record information in such a manner as to permit selective examination of specific portions of an image. For example, let it be assumed that we wish to examine only those portions of an image falling within a certain density range. In the prior art, the aid of a computer would be required. With the present invention, it is possible to record the image such that different spot locations formulating the pixel are utilized to record different ranges of optical density values. Thus, looking again at FIG. 5, by recording optical density values within a certain range in spot location 51, of a second range in spot location 52, etc., it becomes possible to simply lay an appropriate filter over the image such that only spots representing the optical density range of interest will be allowed to pass through.

In general, there are a great many other capabilities provided by the present invention that would become readily apparent to those skilled in the art.

In the description so far we have primarily described a new method of pixel formulation for simultaneously recording information in both a human readable and a machine readable format. The method of pixel formulation could also be used, if desired, to record purely human readable pictorial information or purely machine readable digital information as well.

In applications where human readability is desired, it is necessary that the pixel be formulated in a somewhat symmetrical manner, although some amount of assymetry can readily be tolerated without significantly affecting the quality of the image. In our explanation so far, we have utilized spots arranged in a square matrix, for example, $2\times2$, $3\times3$, etc. Other arrangements could be used as well, if desired. For example, the following symmetrical arrangement of spots could very conveniently be used:

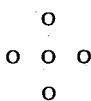

If human readable imagery is not of interest, the method of pixel formulation of the present invention can be used as a convenient way to store large amounts of digital information in a small area. When imagery is not desired, it is not necessary that the pixels be arranged in a symmetrical format and any format convenient for the retrieval of the information can be used. For example, a pixel can be arranged to consist of four or more spots arranged in a straight line, if desired.

In general, with the present invention, an 8-inch diameter by 3-inch thick reel of optical memory tape contains 1000 feet of recording material and can readily store approximately $10^{12}$ information bits. By comparison, a 10-inch diameter by 1-inch thick reel of computer compatible magnetic tape contains 2400 feet of recording material and can store $1.4 \times 10^9$ information bits. Therefore, optical storage practicing the present invention provides a 200-fold improvement in volumetric storage efficiency over computer compatible magnetic tape storage systems.

Figure 6:
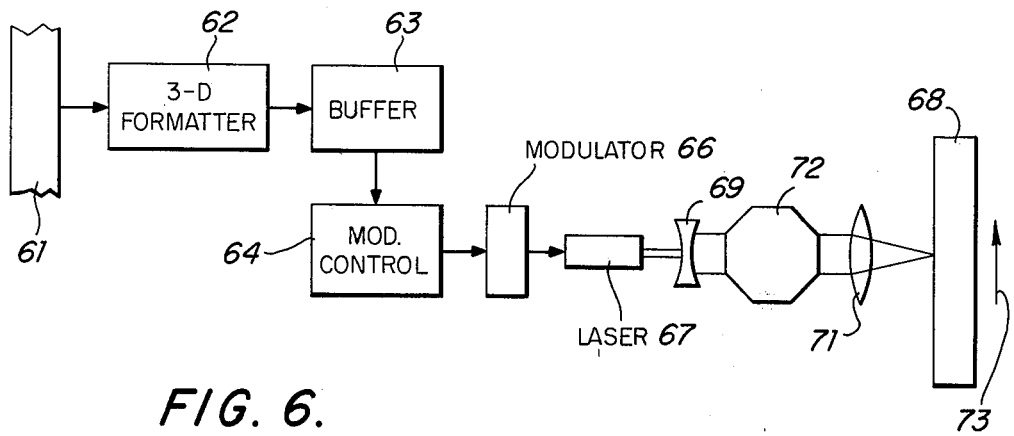
FIG. 6 schematically illustrates a recording set-up which may conveniently be used to record information according to the present invention.

The actual recording equipment utilized to record the reconstructed image may be of generally conventional type and thus need not be discussed in any great detail. For purposes of completeness, however, a brief description of an appropriate set-up is provided with reference to FIG. 6. Initially, we assume the information to be recorded has been processed and stored in digital form on any conventional digital storage medium 61 such as a magnetic tape or disc by conventional means which do not form a part of this invention but are well-known by those skilled in the art. This information is then read into a three-dimensional recording formatter 62 which arranges the data into the desired pixel format, e.g., a 2×2 matrix. This properly formatted information then is fed into buffer storage 63, and from the buffer, the signals are fed to a modulator control system 64 which, in turn, drives modulator 66 to modulate the laser 67 as the laser is scanned across recording medium 68. Specifically, the light beam from the laser is expanded by beam expanding optics 69 and directed across the recording medium via scanner 72 (e.g., a polygonal scanner, solid state scanner, etc.) and imaging lens 71 to record a line of data on the recording medium. By indexing the medium 68 each time a line is recorded as indicated by arrow 73, a series of lines may be recorded on medium 68 in the conventional way.

For increased scanning speed, it is also possible to employ two or more lasers to generate an entire matrix of points with a single scan across the recording medium.

Once recorded, the pictorial information is displayed as a continuous tone (analog) image for human examination. The display can be implemented by any conventional optical projector, or, if desired, magnification and display can be accomplished electronically with a closed circuit television camera and monitor.

Figure 7:
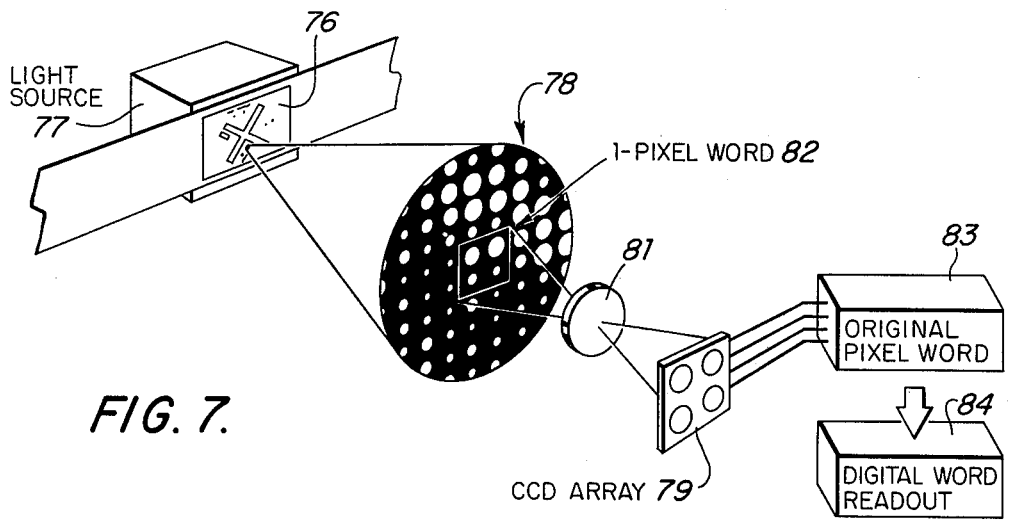
FIG. 7 schematically illustrates a set-up which may be used to retrieve the digital information recorded according to the present invention.

The full range data stored within the body of the pictorial image can be recovered by equipment of the type illustrated in FIG. 7. Specifically, as shown in FIG. 7, the optical memory 76 is illuminated by a light source 77 and the dot pattern 78 is imaged onto an array of charge coupled devices (CCD) 79 by means of lens 81. In this way the digital dot set associated with each pixel word, e.g., pixel word 82, in the optical memory 76 can be sensed, processed and decompressed into the original digital word via conventional electronics illustrated at 83 and 84.

Because the spot size utilized in the present invention can be large enough to require only a small amount of magnification for evaluation, and still permit 12-bit words to be stored and retrieved, relatively simple optics can be used, and the demands on the detector are minimal inasmuch as it only must have the signal to noise capacity to discern 8 modulation levels.

While the presently most preferred embodiments of the invention have been described in substantial detail, it should be apparent that the invention may take many other forms. In addition, while many of the capabilities and features of the invention have been discussed, others will be readily apparent to those skilled in the art. Accordingly, it should be understood that the invention should be limited only insofar as required by the scope of the following claims.

We claim:

1. An optical memory for storing a human readable pictorial image and machine readable digital information with the same format comprising:
   a. an optical recording medium;
   b. a pictorial image recorded on said optical recording medium, said pictorial image comprising a large number of separate picture elements, each of said picture elements having a specific optical density value such that all of the large number of picture elements taken together will construct said pictorial image; and
   c. each of said large number of picture elements comprising a plurality of discrete parts each of which contribute to and which together define a specific digital value for storing said machine readable digital information.

2. An optical memory as recited in claim 1 wherein the specific digital value defined by the plurality of discrete parts of each one of said picture elements is defined by the optical density value of each of said plurality of discrete parts, and wherein the sum of the optical density values of each of said discrete parts is equal to the optical density value of the picture element that comprises said plurality of discrete parts.

3. An optical memory as recited in claim 2 wherein said plurality of discrete parts comprise a plurality of discrete spots.

4. An optical memory as recited in claim 3 wherein the digital value of said plurality of discrete spots is defined by the modulation level of each of said plurality of discrete spots.

5. An optical memory as recited in claim 4 wherein each of said large number of picture elements comprise a two-dimensional arrangement of discrete spots.

6. An optical memory as recited in claim 5 wherein said two-dimensional arrangement of discrete spots comprises a 2×2 matrix of discrete spots.

7. An optical memory as recited in claim 4 wherein said optical recording medium comprises a metal-on-plastic recording material and wherein the area of each of said discrete spots defines the modulation level of each of said spots.

8. An optical memory as recited in claim 4 wherein said optical recording medium comprises film and wherein the exposure level of each of said discrete spots defines the modulation level of each of said spots.

9. An optical memory as recited in claim 1 wherein said pictorial image comprises said large number of separate picture elements recorded in a raster pattern.

10. An optical memory as recited in claim 1 wherein said pictorial image comprises a human readable pictorial image.

11. A method for storing a pictorial image and machine readable digital information within the same format comprising:
   a. recording a large number of separate picture elements on an optical recording medium;
   b. controlling the optical density value of each of said picture elements such that all of said picture elements taken together construct said pictorial image; and
   c. formulating each of said picture elements as a plurality of discrete parts each of which contribute to and when taken together define a specific digital value for storing said machine readable digital information.

12. A method as recited in claim 11 wherein said recording step comprises recording said plurality of picture elements in a raster pattern fashion on said optical recording medium.

13. A method as recited in claim 11 wherein said formulating step comprises individually controlling the optical density value of each of said plurality of discrete parts of each one of said picture elements to define the specific digital value defined by said plurality of discrete parts while at the same time maintaining the sum of the optical density values of each of said plurality of discrete parts equal to the optical density value of said picture element that comprises said plurality of discrete parts.

14. A method as recited in claim 13 wherein said formulating step comprises formulating each of said picture elements as a plurality of discrete spots, and further includes the step of controlling the modulation level of each of said discrete spots for defining said specific digital value.

15. A method as recited in claim 14 and further including the step of incorporating at least one additional spot within each of said picture elements for storing collateral information.

16. A method as recited in claim 13 wherein the optical density value of each of said plurality of discrete parts may be varied among a plurality of discrete values.

* * * * *